US010866322B2

(12) United States Patent
Talapov

(10) Patent No.: US 10,866,322 B2
(45) Date of Patent: Dec. 15, 2020

(54) IDENTIFICATION OF SHADOWING ON FLAT-TOP VOLUMETRIC OBJECTS SCANNED BY LASER SCANNING DEVICES

(71) Applicant: Datalogic USA, Inc., Eugene, OR (US)

(72) Inventor: Andrei L. Talapov, Lansdale, PA (US)

(*) Notice: Subject to any disclaimer, the term of this patent is extended or adjusted under 35 U.S.C. 154(b) by 159 days.

(21) Appl. No.: 16/237,371

(22) Filed: Dec. 31, 2018

(65) Prior Publication Data

US 2020/0209399 A1  Jul. 2, 2020

(51) Int. Cl.
  *G06T 7/521* (2017.01)
  *G01S 17/89* (2020.01)
  *G06T 7/507* (2017.01)

(52) U.S. Cl.
  CPC .............. *G01S 17/89* (2013.01); *G06T 7/507* (2017.01); *G06T 7/521* (2017.01)

(58) Field of Classification Search
  None
  See application file for complete search history.

(56) References Cited

U.S. PATENT DOCUMENTS

| 7,586,049 | B2 * | 9/2009 | Wurz | G01B 11/04 |
| | | | | 177/145 |
| 9,373,017 | B2 * | 6/2016 | Liu | G06K 7/10831 |
| 9,501,683 | B1 * | 11/2016 | Hatstat | G06K 7/1491 |
| 9,645,240 | B1 * | 5/2017 | Ossig | G01S 7/4808 |
| 2012/0001789 | A1 * | 1/2012 | Schilling | G01S 17/89 |
| | | | | 342/54 |
| 2016/0238377 | A1 * | 8/2016 | Palmen | G01B 11/22 |
| 2016/0314593 | A1 * | 10/2016 | Metzler | G01C 15/002 |
| 2017/0122736 | A1 * | 5/2017 | Dold | B64B 1/40 |
| 2019/0094346 | A1 * | 3/2019 | Dumoulin | G01S 17/42 |
| 2020/0209399 | A1 * | 7/2020 | Talapov | G01S 17/89 |

* cited by examiner

*Primary Examiner* — Iman K Kholdebarin
(74) *Attorney, Agent, or Firm* — Stoel Rives LLP; Robert R. Teel

(57) ABSTRACT

Disclosed are techniques for detecting presence of shadowing introduced in a system. The techniques entail geometrically projecting, along a virtual or actual propagation direction of laser beam scanning, points of a lower convex hull (CH) planar object in a direction toward a higher CH planar object to establish projection locations of the points of the lower CH planar object along the propagation direction. Detection of whether the projection locations are in proximity to locations of points of the higher CH planar object is performed. In response to detecting locations in proximity for each source laser beam scanning, a shadowing event indication is generated to alert a user of the system that shadowing has been introduced in the system.

20 Claims, 8 Drawing Sheets

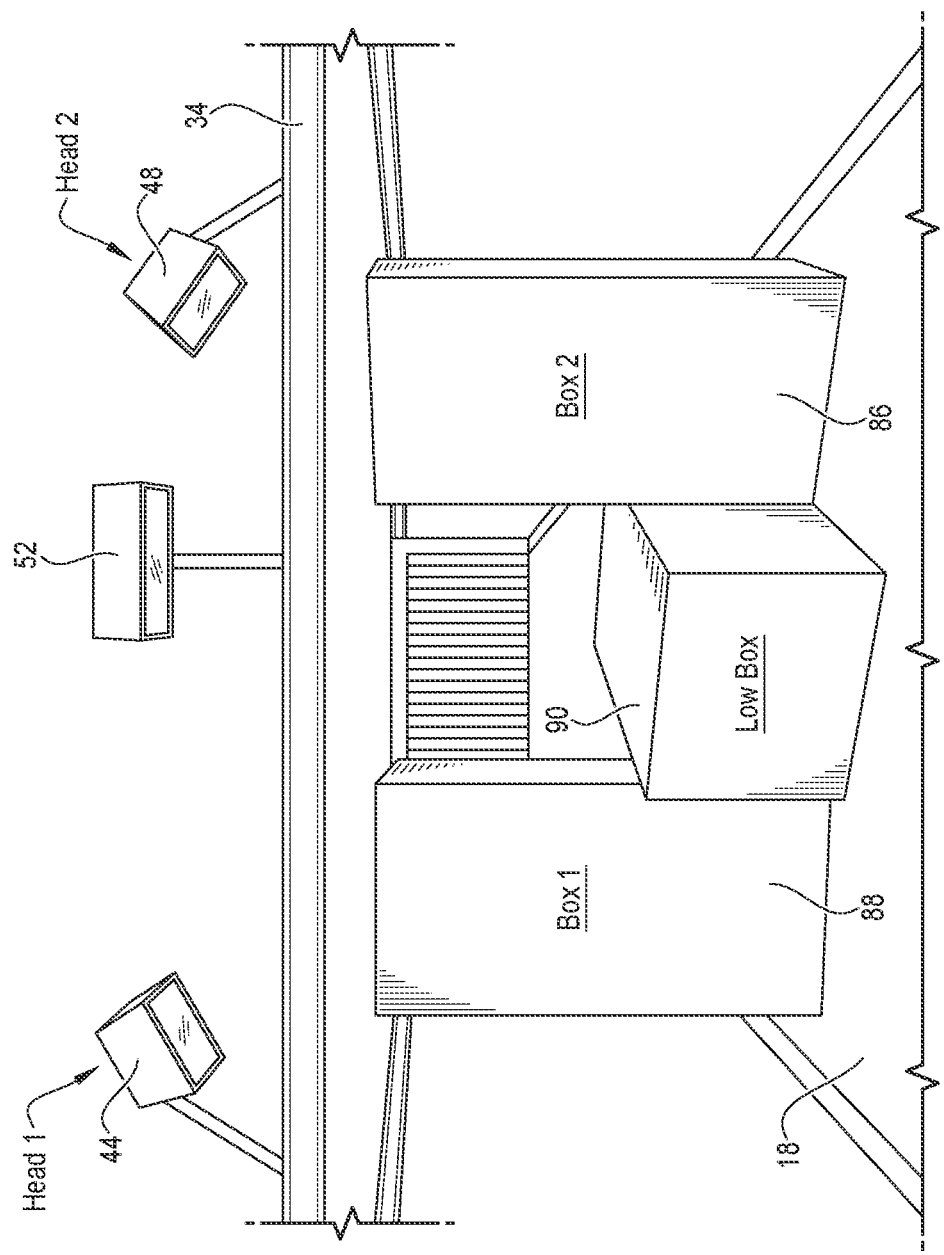

US 10,866,322 B2

IDENTIFICATION OF SHADOWING ON FLAT-TOP VOLUMETRIC OBJECTS SCANNED BY LASER SCANNING DEVICES

TECHNICAL FIELD

This disclosure relates generally to laser scanning of volumetric objects and, more particularly, to dimensioners for obtaining width, height, and length dimensions of flat-top volumetric objects.

BACKGROUND INFORMATION

Industrial customers deploy dimensioners to measure dimensions of flat-top cylinders, cuboids, or other polyhedron prism-shaped volumetric objects. Example dimensioners include the DM3610 and DM3500 industrial laser scanning devices available from Datalogic USA, Inc., which is the present applicant. Additional details describing dimensioners, their associated optical and laser equipment, circuitry, and data processing systems are available in patent documents assigned to Datalogic USA, Inc. or its affiliated companies. Examples of such patent documents include U.S. Pat. No. 7,586,049 of Wurz and U.S. Pat. No. 9,373,017 of Lie et al.

Some flat-top volumetric objects are sufficiently spaced apart on a conveyor belt (i.e., singulated) so as to be completely visible by scanning dimensioner heads. In other so-called mass flow situations, however, taller flat-top volumetric objects cast a shadow on shorter flat-top volumetric objects by occluding laser beams emitted from laser scanning heads. This shadowing may cause the dimensioners to report incorrect sizes. Customers, however, tend to expect dimensioners to provide minimal bounding box sizes for scanned flat-top volumetric objects. For the purpose of so-called "Legal For Trade Revenue Recovery" classification, these sizes should be within certain tolerance limits that are challenging to meet in the presence of shadowing. Nevertheless, as with other measurement instruments, dimensioners require certain conditions for correct operation. If such conditions are violated, then correct sizes may not be obtained in some cases. Such cases previously included, for example, objects with very low reflectivity for the laser light. In such cases, customers demand that "noDim" message be provided to indicate that the dimensions may not be correct. Other cases, however, have been challenging to report as "no Dim."

SUMMARY OF THE DISCLOSURE

This disclosure describes rapid and efficient ways by which to determine whether "noDim" should be reported due to cases in which shadowing of lower objects by higher ones. Previously, some customers assumed responsibility to prevent such shadowing situations, but in new, so-called "mass flow" applications, shadowing is likely to occur.

For flat-top volumetric objects that are commonly the subject of dimensioning, disclosed are techniques by which to identify with a high probability of accuracy the presence of shadowing by analysis of locations of unshadowed points. The disclosed techniques need not provide for identification of shadowing with absolute certainty because, as a practical matter, shadowed portions of scanned flat-top volumetric objects are, by definition, not visible without adding additional laser scanning devices. Thus, this disclosure describes techniques for detection of shadowed flat-top volumetric objects based on data available from existing equipment.

Disclosed are techniques for detecting presence of shadowing introduced in a system including one or more laser scanning devices employing laser beam scanning for facilitating extraction of convex hull (CH) planar objects from a three-dimensional (3D) point cloud representing two or more flat-top volumetric objects of different heights on a transport device. The shadowing is attributable to a taller one of the two or more flat-top volumetric objects occluding the laser beam scanning from reaching at least a portion of a shorter one of the two or more flat-top volumetric objects. The CH planar objects representing unoccluded upper surface regions of the two or more flat-top volumetric objects with lower and higher CH planar objects corresponding to, respectively, the shorter and taller flat-top volumetric objects. Thus, in some embodiments, the techniques entail geometrically projecting, along a propagation direction of the laser beam scanning, points of the lower CH planar object in a direction toward the higher CH planar object to establish projection locations of the points of the lower CH planar object along the propagation direction; detecting whether the projection locations are in proximity to locations of points of the higher CH planar object; and in response to detecting locations in proximity for each of the one or more laser scanning devices, generating a shadowing event indication to alert a user of the system that shadowing has been introduced in the system.

Additional aspects and advantages will be apparent from the following detailed description of embodiments, which proceeds with reference to the accompanying drawings.

BRIEF DESCRIPTION OF THE DRAWINGS

FIG. 3 is an annotated perspective view showing, as viewed along a direction that is opposite to the direction of transport of FIGS. 1 and 2, an experimental test setup including the three flat-top volumetric objects and the two dimensioner heads of FIG. 2.

DETAILED DESCRIPTION OF EMBODIMENTS

Figure 1:
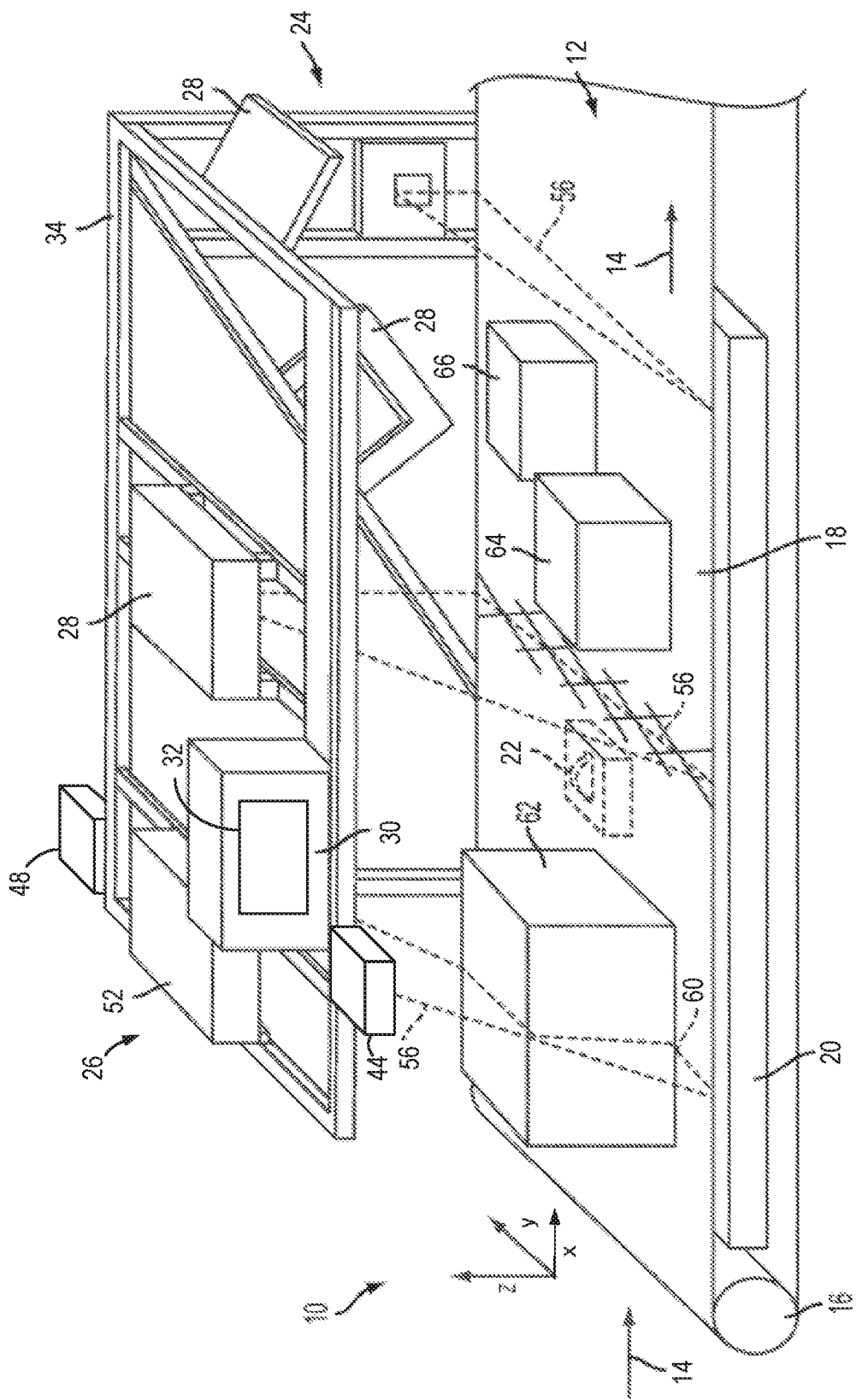
FIG. 1 is an isometric view of a system including a transport device and a mounting frame on which is mounted a display interface, data readers, processing devices, and multiple laser scanning devices.

FIG. 1 shows a system 10 including a conveyor system 12 for moving flat-top volumetric objects along a path of travel 14. Conveyor system 12 includes a number of motor-driven rollers 16 to move a belt 18; a bed 20; an encoder, tachometer, or other belt speed measurement device 22; and possibly a scale (not shown). It should be appreciated that other embodiments may move items by means other than belts and may include other components or exclude some of the aforementioned components.

System 10 further includes an identification system 24 configured to track packages moved by conveyor system 12. Identification system 24 includes a dimensioning system 26, a plurality of data readers 28 (e.g., optical code readers such as laser barcode scanner or imager-based barcode readers), and a computer 30 including an optional user interface (e.g., a display) 32, all of which may be attached to a frame 34 that supports dimensioning system 26, at least one data reader 28, and other equipment above conveyor belt 18. In other embodiments, computer 30, user interface 32, or other processing resources (e.g., a remote server) are located away from frame 34.

Barcode readers 28 may be used together with dimensioning system 26, but they need not be employed in dimensioning or shadow detection described later. It should be appreciated that cameras, wireless signal readers, or other suitable barcode readers could be used in identification system 24, depending on the needs of a given system and provided they do not interfere with dimensioner operations.

Dimensioning system 26 includes a first dimensioner head 44, a second dimensioner head 48, and associated processing circuitry 52 for processing captured scan information. Dimensioner heads 44 and 48 are also referred to simply as dimensioners, and they may share associated processing circuitry 52 or have separate local or remotely located data processing recourses. Dimensioners 44 and 48 may both be time-of-flight type dimensioners configured to scan along a Y-Z using a narrow laser beam. Performance of other types of laser scanning devices susceptible to shadowing may also be enhanced by the disclosed techniques.

Beams of light 56 (e.g., laser beams) emitted by dimensioner and other devices intersect top surfaces of packages arranged vertically in which one of the flat-top sides faces upward from a plane defined by belt 18 moving the volumetric objects through a scan volume. Rotation of laser beams 56 permits capture of scan points in a Y-Z plane. In general, dimensioners 44 and 48 each comprises a light source such as a laser (not shown) and a rotating reflector disposed within the dimensioner that are used to produce a laser beam scanning (also referred to as scanning beam or scan beam, denoted in phantom at 60) directed down at belt 18.

Processing circuitry 52 determines, based on 3D point cloud of scan points, a 3D profile of an object 62 (i.e., its height on belt 18, width, and length dimensions), as well as its orientation on belt 18, and states of multiple packages, i.e. whether they are singulated or non-singulated. For purposes of this discussion, packages in a singulated line are placed on belt 18 with spaces between therebetween. A non-singulated (i.e., mass flow) group of packages occurs when packages are placed on belt 18 adjacent to, alongside, or otherwise sufficiently close to one another so that a given package is shadowed. For example, in FIG. 1, package 62 is singulated with respect to packages 64 and 66, but packages 64 and 66 are likely non-singulated with respect to each, depending on their sizes, closeness, and number and location of laser scanning devices.

Notwithstanding the type of dimensioner used in system 10, output data generated by dimensioning system 26 defines a boundary of a dimensioned package and its location with respect to that of adjacent packages (or sufficient data by which this information may be determined by other processing devices). Moreover, this disclosure describes supplementing previously reported information to indicate whether shadowing is present so as to alert a user that parcels should be singulated, rescanned, or that other corrective actions should be considered in response to the presence of shadowing.

Figure 2:
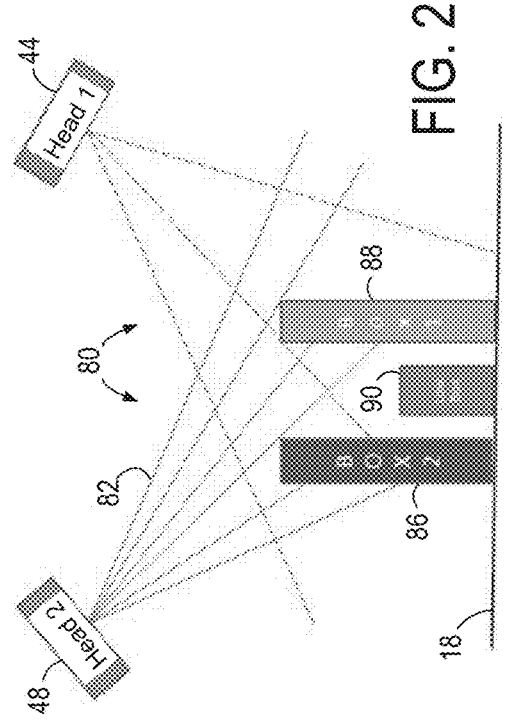
FIG. 2 is an annotated front elevation view of a block diagram showing, as viewed along a direction of transport of FIG. 1, two taller boxes and a shorter box therebetween (i.e., cuboid parcels) atop the transport device moving the boxes along the direction of transport though a scan volume formed by laser beam emission from two dimensioner heads, located above and towards the sides of the transport device, for capturing a three-dimensional (3D) point cloud representing flat-top volumetric objects.

FIG. 2 shows a simplified block diagram of three, side-by-side boxes (i.e., cuboid packages) atop belt 18 that is moving the boxes through a scan volume 80 formed by laser beam emission 82 from dimensioners 44 and 48. Specifically, a first box 86 and a second box 88 are each about 36 inches tall and a third box 90 that is placed therebetween is 16 inches tall. First and second boxes 86 and 88 shadow third box 90 by preventing laser been emission 82 from reaching an upper portion of third box 90. For additional clarity, FIG. 3 shows an annotated perspective view of actual boxes 86, 88, and 90; dimensioners 44 and 48 and associated processing circuitry 52; frame 34; and belt 18. The specific arrangement of items shown in FIG. 3 and the graphs that follow are simply examples illustrating shadowing. Other arrangements are also possible.

Figure 4:
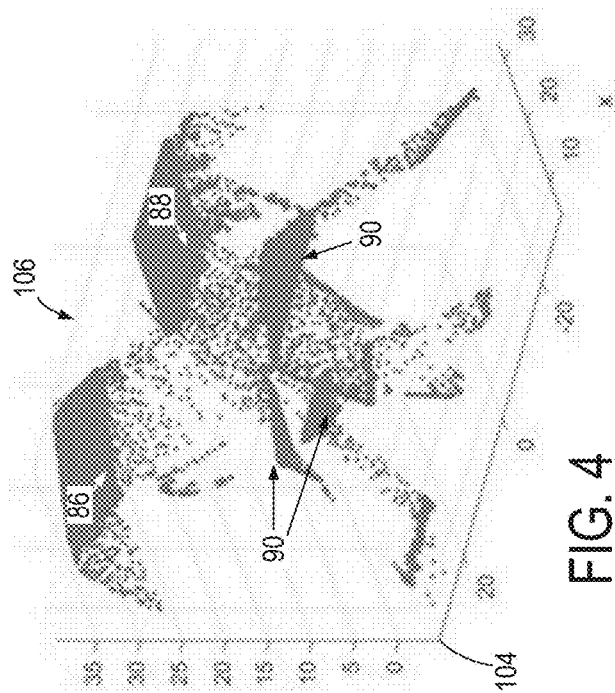
FIG. 4 is a graph showing, in a 3D coordinate space, scan points forming a 3D point cloud of scanned location data captured in connection with the experimental test setup of FIG. 3.
Figure 6:
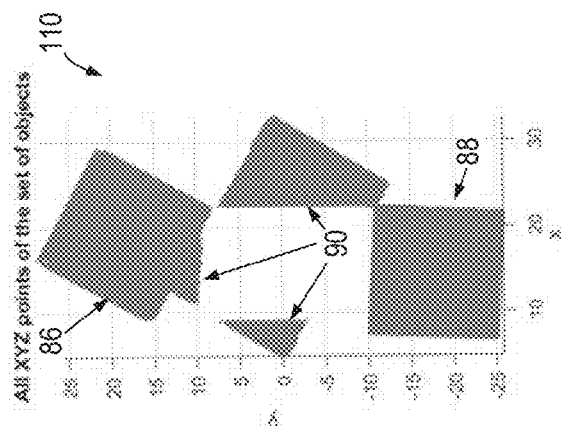
FIG. 6 is a graph showing, in a two-dimensional (2D) coordinate space defining an X-Y plane, the refined 3D point cloud of FIG. 5.
Figure 5:
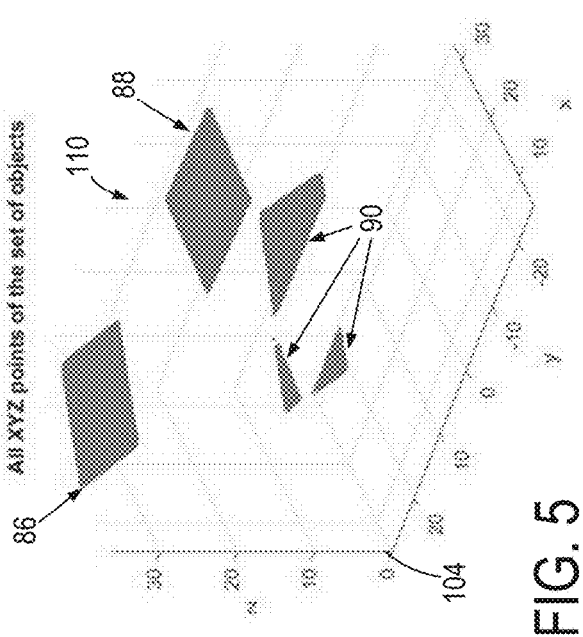
FIG. 5 is a graph showing, in the 3D coordinate space of FIG. 4, the 3D point cloud after it has been refined by removal of scanned location data corresponding to points on the conveyor belt and other point locations that are not from tops of the three flat-top volumetric objects of FIGS. 2 and 3.

FIG. 4 is a graph showing, in a 3D coordinate space 104, points forming a 3D point cloud 106 of scanned location data captured in connection with the experimental test setup of FIG. 3. Some points in the 3D point cloud 106 correspond to surfaces of box 86, 88, and 90 whereas other points correspond to a mixture of box top edge points and belt points, thereby representing false scan points. Although false points might tend to show how laser beams propagate from dimensioners 44 and 48, the false points need not be employed for the purpose of identifying shadowing. Accordingly, as shown in FIGS. 5 and 6, false points are removed from 3D point cloud 106 (FIG. 4) to establish a refined 3D point cloud 110 showing points of unoccluded upper surface regions of boxes 86, 88, and 90. Removal of false points is optional, in some embodiments.

Figure 7:
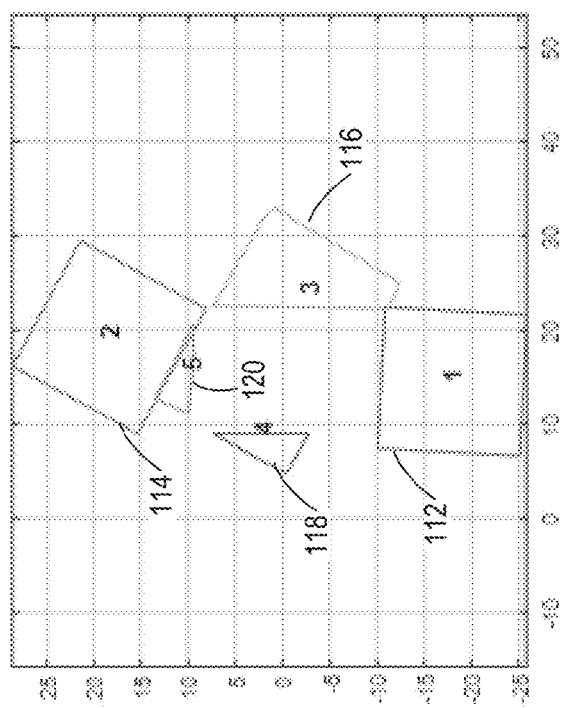
FIG. 7 is an annotated graph showing, in the X-Y plane of FIG. 6, five convex hull (CH) planar objects extracted from the refined 3D point cloud of FIG. 5, in which the first and second CH planar objects correspond to upper surface regions of, respectively, the first and second taller boxes of FIG. 3 and the latter three CH planar objects correspond to unoccluded upper surface regions of the shorter box of FIG. 3.

FIG. 7 shows five CH planar objects extracted from refined 3D point cloud 110, in which the first two CH planar objects correspond to upper surfaces of, respectively, first and second taller boxes 86 and 88. The latter three CH planar objects correspond to unoccluded upper surface regions of shorter box 90.

With respect to a process of extracting CH planar objects from a 3D point cloud, skilled persons will appreciate that there are various data analysis functions that may be performed using filtering techniques (i.e., to remove spurious points from captured of belt 18) and point clustering algorithms. For example, refinement of a 3D point cloud and generation of CH planar objects may be achieved by performing a random sample consensus (RANSAC) on 3D point cloud 106 so as to remove spurious points scattered at various heights and cluster the relatively closely spaced apart points that generally share a common plane. The outermost contiguous points on the common plane define a CH planar object in the X-Y plane encompassing the contiguous points. Thus, FIG. 7 shows CH planar objects 112, 114, 116, 118, and 120. FIG. 7 does not show a Z axis, but it should be noted that CH planar objects 116, 118, and 120 are lower than CH planar objects 112 and 114.

According to some embodiments, the foregoing procedure includes finding a CH and then finding a bounding box (BB) around that CH. CHs may have many segments and, in general, may be of any convex polygon shape. A BB is a minimal size rectangle around a CH so, if by chance a CH is rectangular, then it will coincide with its corresponding BB.

Some attempts to identify whether objects are shadowed could focus on irregular shapes (e.g., triangular or irregular polygons) for bounding boxes. In general, however, truncated shadowed boxes may appear from 3D point cloud data as perfectly rectangular, which introduces uncertainty in ascertaining whether an irregular shape is actually the result of shadowing. Actual irregularly shaped objects may be placed on a conveyor belt in mass flow, which introduces more uncertainty.

A robust method of shadowing identification is desired for detecting presence of shadowing among any number of flat-top volumetric objects of arbitrary sizes, orientations, and heights. Likewise, shadowing identification for any number of scanning dimensioner heads is also desired because, although increasing a number of scanning dimensioner heads reduces the likelihood of shadowing, simply increasing the amount of hardware involved is impractical and can never completely eliminate shadowing. This disclosure, therefore, describes shadowing detection algorithms capable of working with any number of dimensioner heads.

Figure 8:
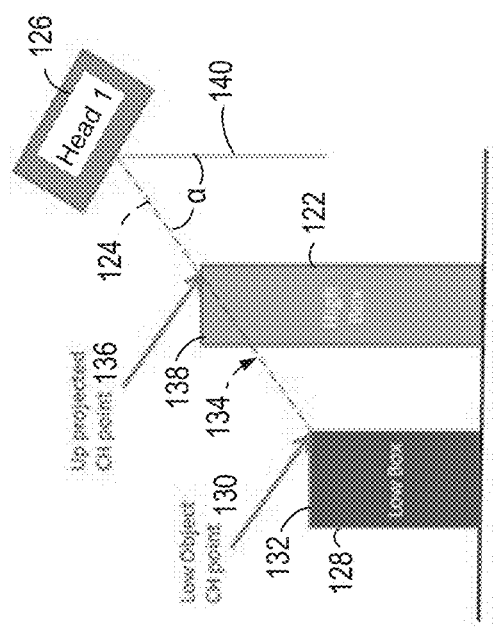
FIG. 8 is a front elevation view of a block diagram showing a taller flat-top box occluding a laser beam emitted by a first dimensioner head from reaching a shorter flat-top box.

Before describing different approaches for robustly detecting shadowing, a description of geometrically projecting points along virtual and actual beam propagation directions is initially provided with reference to FIG. 8. For example, FIG. 8 shows a box 122 occluding a laser beam 124 emitted by a first dimensioner head 126 from reaching a shorter flat-top box 128 at an occluded point 130. Nevertheless, assume occluded point 130 is available in a 3D point cloud because a different dimensioner head (not shown) captured it so as to include it in a lower CH planar object 132. Accordingly, point 130 is available when performing a geometric projection of it upwardly along a so-called virtual propagation path 134 of laser beam 124 in a direction toward first dimensioner head 126 to a location of an unoccluded point 136 in a higher CH planar object 138.

Irrespective of whether virtual or actual beam propagation paths are employed, geometry is used to project a location of a point of a lower CH planar object to the height of a higher CH planar object. For instance, alpha is defined as an angle between laser beam (virtual or actual) 124 and vertical reference 140. The following formula provides for the projection of the location according to its change in a Y coordinate:

change of $Y=(Zlow-Zhigh)\tan(alpha)$, where Zlow and Zhigh are heights of corresponding boxes.

Finding angle alpha from a known point's YZ coordinates of a lower CH planar object entails solving a highly non-linear function that is essentially an inverse of a calibration function used in dimensioning setup procedures, which is used to provide YZ coordinates given a laser beam angle and distance between a scanning dimensioner head and a scan point. For example, Newton successive approximations are used to obtain angle alpha from the known YZ coordinates.

When referring to upward projections, skilled persons will appreciate that coordinate locations of points are geometrically projected (not points themselves), but this description also refers to projecting points or projecting CHs as shorthand for referring to projecting coordinate locations of points. Relatedly, describing that CHs shadow objects (or vice versa) is a another shorthand term because technically, a volumetric object shadows other volumetric objects. Nevertheless, skilled persons will appreciate that a CH is associated with the volumetric object and, for conciseness, this disclosure occasionally mentions that CHs shadow other CHs or volumetric objects.

Turning back to the aforementioned approaches for achieving robust shadowing detection, the following paragraphs set forth descriptions of top-down and bottom-up approaches.

The top-down approach more or less entails about four steps. First, laser beam angles along edges of higher boxes are found. Second, according to the angles, higher box edges are projected to the height of the top of the lower object, hence the top-down name. This potentially shadowed lower object top may be non-rectangular in shape, so a more accurate term for referring to this shape is a (lower) CH planar object of the lower object top surface. Third, an intersection region of the projections of all higher boxes to the interior of the lower CH planar object is found. Fourth, if the intersection is not empty and touches the lower CH planar object(s), then the lower object is, indeed, shadowed.

For the bottom-up approach, a step-by-step sequence is shown in FIGS. 9-12. Initially, however, the following paragraphs provide an overview of the approach.

In general, instead of projecting edges of higher boxes to the height of lower objects, points of a CH of a lower object are projected to locations having a same height of higher objects. After a point of the lower CH planar object is projected, it is connected to its projected location by straight line in an X-Y plane and several proximity determinations are performed. These checks are used to confirm or reject an indication of the presence of shadowing. The order of at least some of the determinations may vary for different implementations.

If the straight line intersects (in the X-Y plane) a CH of the higher box, then the point of the lower CH planar object that was projected is presumably shadowed by that particular higher object. An advantage of this proximity detection determination is that, instead of a calculation of complicated intersections of down projections, proximities of a well-defined number of lines to higher objects is readily checked. For example, a typical CH has about 70 points so there are 70 lines connecting CH points to their projections to a higher object.

Presumably shadowed means that the shadowing is initially deemed possible and may be confirmed based on additional proximity comparison tests. For example, if the straight line does not intersect higher object CH, but passes very close to a corner of a CH of the higher box, or if the projected location of a point of the lower CH is sufficiently close (i.e., within a predetermined threshold distance) to the CH of the higher box, then it is probable that the lower object associated with the projected point is, indeed, shadowed by the particular higher object under consideration. In contrast, for a point initially presumed to be shadowed, if the original (not projected) point is sufficiently close to the CH of the higher box, then it is probable that the point is not actually shadowed.

Such tests and confirmation checks are performed for each point of CHs of lower objects, which are projected upwardly to heights associated with each of the higher objects and in directions for each of the scanning dimensioner heads. Each point of a CH planar object of a lower object is considered presumably shadowed for a given scanning head if it is shadowed by at least one higher object. And each presumably shadowed point is confirmed shadowed if it is presumably shadowed for each scanning head.

If conditions described above are satisfied, then the lower object is declared "shadowed" in addition to reported as "no Dim." Accordingly, the user is alerted that he or she need not try to use the sizes of that object for Revenue Recovery, according to some embodiments.

In some embodiments, due to tolerances in coordinates of CH planar objects, some spurious shadowing points may be found. To exclude them, the lower object is considered shadowed if shadowed CH points form a continuous straight or curved line of a length exceeding some tolerance limit, such as, for example, two inches. Relatedly, each point need not be projected, in some embodiments. For example, to provide sufficient resolution for identification of shadowing, a subset of points may be selected so as to ensure a desired distance between selected points meets a sufficiently small spacing distance, such as, for example, one inch spacing. Other points, however, may be ignored.

Figure 9:
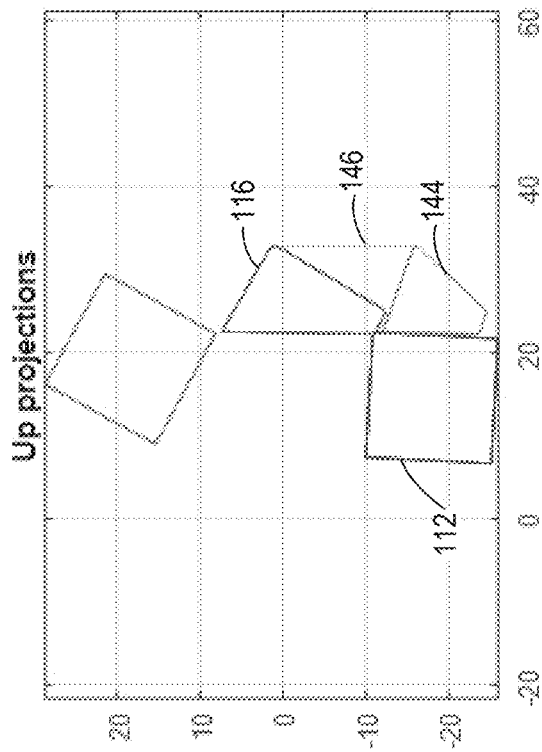
FIGS. 9-11 are three graphs showing, in the X-Y plane of FIG. 6, a sequence in which the latter three CH planar objects of FIG. 7 are upwardly projected along a propagation direction toward the first dimensioner head of FIGS. 1-3 and to a height of the first CH planar object of FIG. 7.
Figure 10:
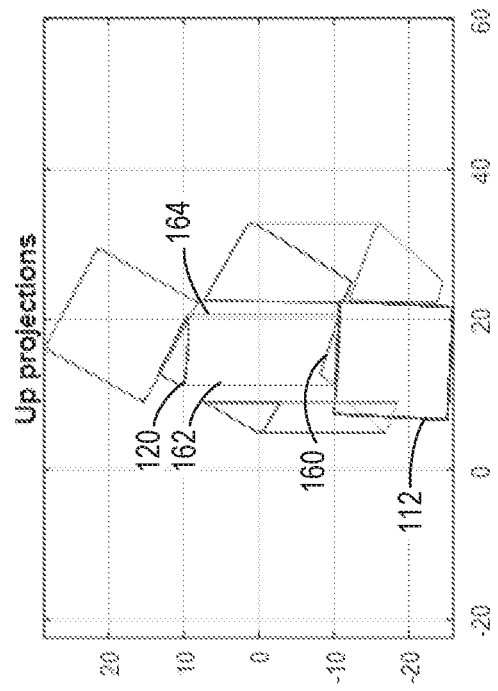
Figure 11:
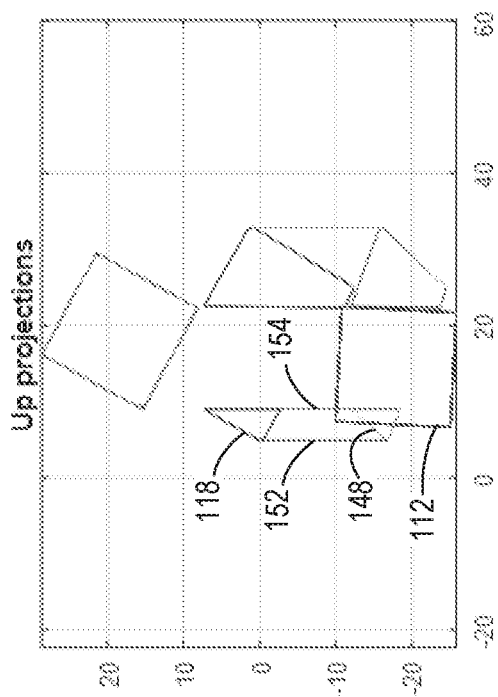
Figure 12:
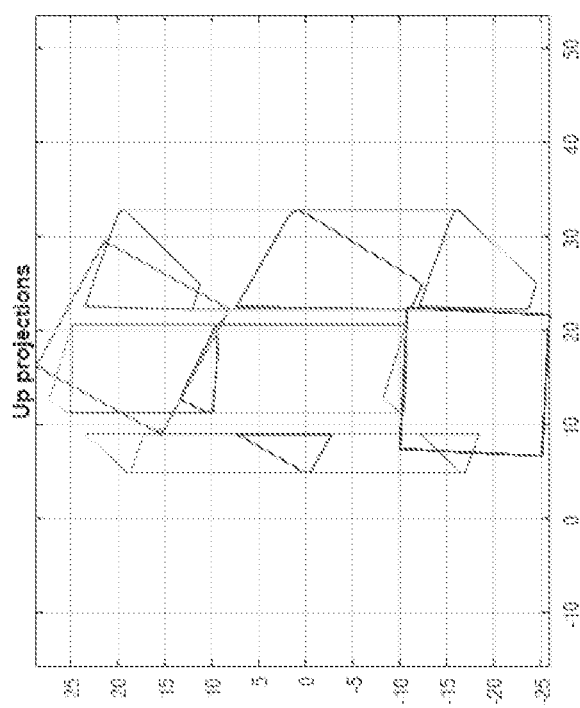
FIG. 12 is a graph supplementing the view of FIG. 11 by also showing the latter three CH planar objects of FIG. 7 upwardly projected along a propagation direction toward the second dimensioner head of FIGS. 1-3 and to a height of the first CH planar object of FIG. 7.

To make clear the process of projecting CHs of lower objects to the height of higher CHs, FIGS. 9-11 show a sequence projections of the lower CHs toward the first scanning dimensioner head 44 and to the height of the highest object (i.e., box 112, FIG. 7). First scanning dimensioner head 44 is positioned at negative Y values, out from a lateral edge of belt 18, so upward projections are shown as being shifted toward negative Y, i.e., closer to first scanning dimensioner head 44. FIG. 12 supplements view of FIG. 11 so as to also show upward projections in a direction toward second scanning dimensioner head 48, which is positioned at positive Y values, out from an opposite lateral edge of belt 18. Thus, the additional upward projections of FIG. 12 are shown as being shifted toward positive Y.

FIG. 9 shows the upward projection of points of CH 116. Note that because laser beams emitted from first scanning dimensioner head 44 are not parallel in the Y-Z plane and are approximately emitted from one point at first scanning dimensioner head 44, the shape of an upward projection CH 144 (i.e., the projected counterpart of CH 116) is somewhat distorted compared to the shape of CH 116. Nevertheless, FIG. 9 shows that, on the way up from CH 116 to the height of CH 112, upward projection CH 144 is in proximity to (e.g., contacts or overlaps with) a right corner of CH 112. For completeness, one straight line 146 at the most positive Y values is also shown as an example of the straight lines employed in the aforementioned proximity detection checks, but another straight line at lower Y values is covered by CH 112.

Based on the aforementioned proximity detection checks, CH 116 is presumably shadowed by the corner that obscures CH 116 from first scanning dimensioner head 44. The initial presumption may be confirmed based on subsequent proximity detection confirmations (e.g., performing upward projections in a direction toward second scanning dimensioner head 48).

FIG. 10 shows an upward projection CH 148 of CH 118. Straight lines 152 and 154 are also shown. Because upward projection CH 148 crosses CH 112, CH 118 is shadowed from first dimensioner head 44 by CH 112. Although points of a rightmost part of CH 148 are encompassed within CH 112 and would be invisible to first dimensioner head 44, points of a rightmost part of CH 118 are visible to second dimensioner head 48. This demonstrates how the points of a rightmost part of CH 118 are upwardly projected along a virtual beam path toward first dimensioner head 44.

FIG. 11 shows an upward projection CH 160 of CH 120 and two straight lines 162 and 164. An edge of CH 160 touches along one side CH 112. This means that the CH 120 is shadowed from first dimensioner head 44 by CH 112. Further proximity determinations would confirm whether CH 120 is also shadowed for second dimensioner head 48. For example, FIG. 12 shows a complete set of upward projections for both heads 44 and 48.

Figure 13:
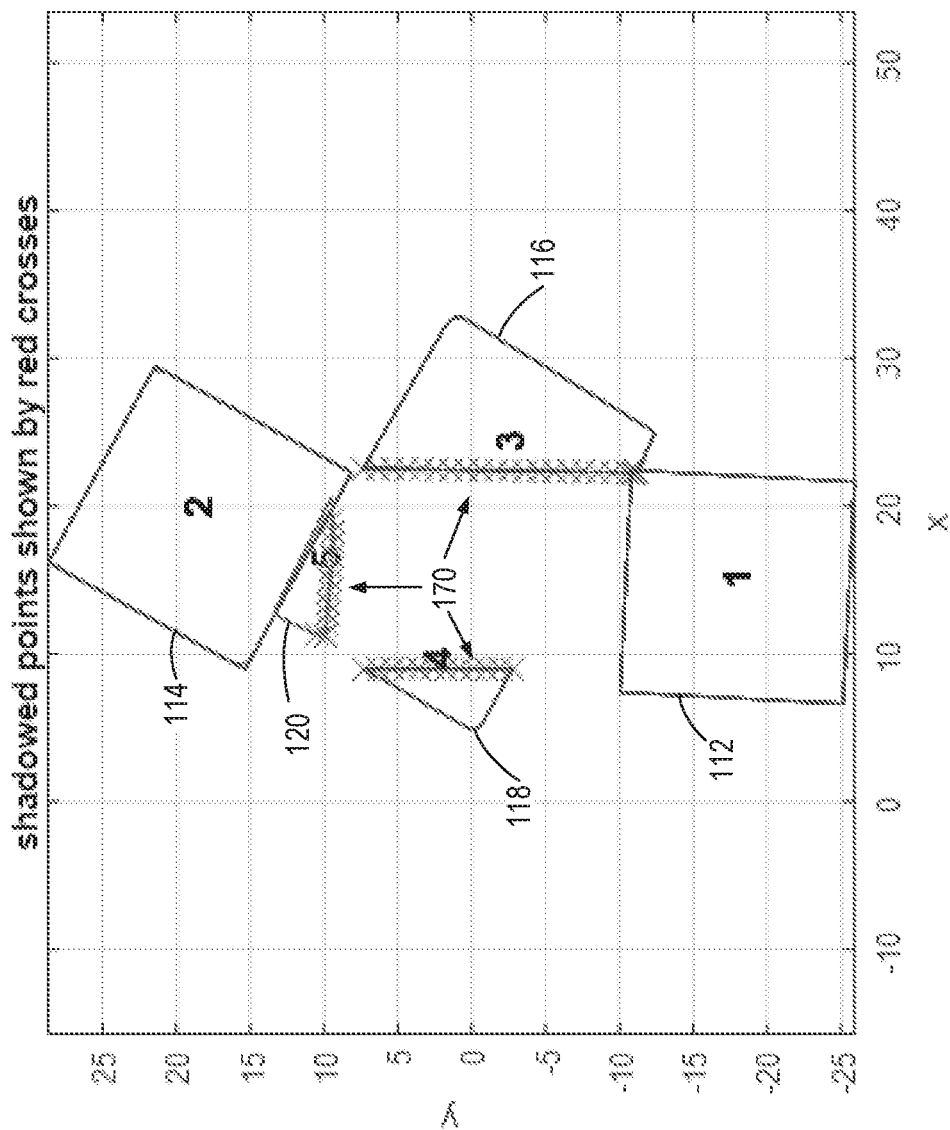
FIG. 13 is an annotated graph identifying shadowed points of the latter three CH planar objects of FIG. 7 for the purpose of providing a shadowing event indication on the display interface of FIG. 1.

Upon application of the shadowing detection criteria specified above, a final set of the shadowed edges is marked by small crosses 170 shown in FIG. 13. A similar graph or other shadowing event indications may be presented on display interface 32 so as to alert users. For instance, text-based alerts are another example of a shadowing event indication that may be automatically delivered upon detection of the presence of shadowing.

The described approaches to shadowing detection assume flat horizontal tops of the objects. If that is not the case, then shadowing detection would be much more computationally intensive and time consuming, as it would require full ray tracing for all the scanning heads and all the objects. Such time consuming calculations may not be acceptable due to very limited time available for dimensioning of objects moved by high speed conveyor belt. Also, if there is no shadowing of the CH perimeter, there still may be internal parts of the lower box that are shadowed. But if the lower object does not have voids inside the perimeter, then shadowing of internal parts of the box is of no moment.

Figure 14:
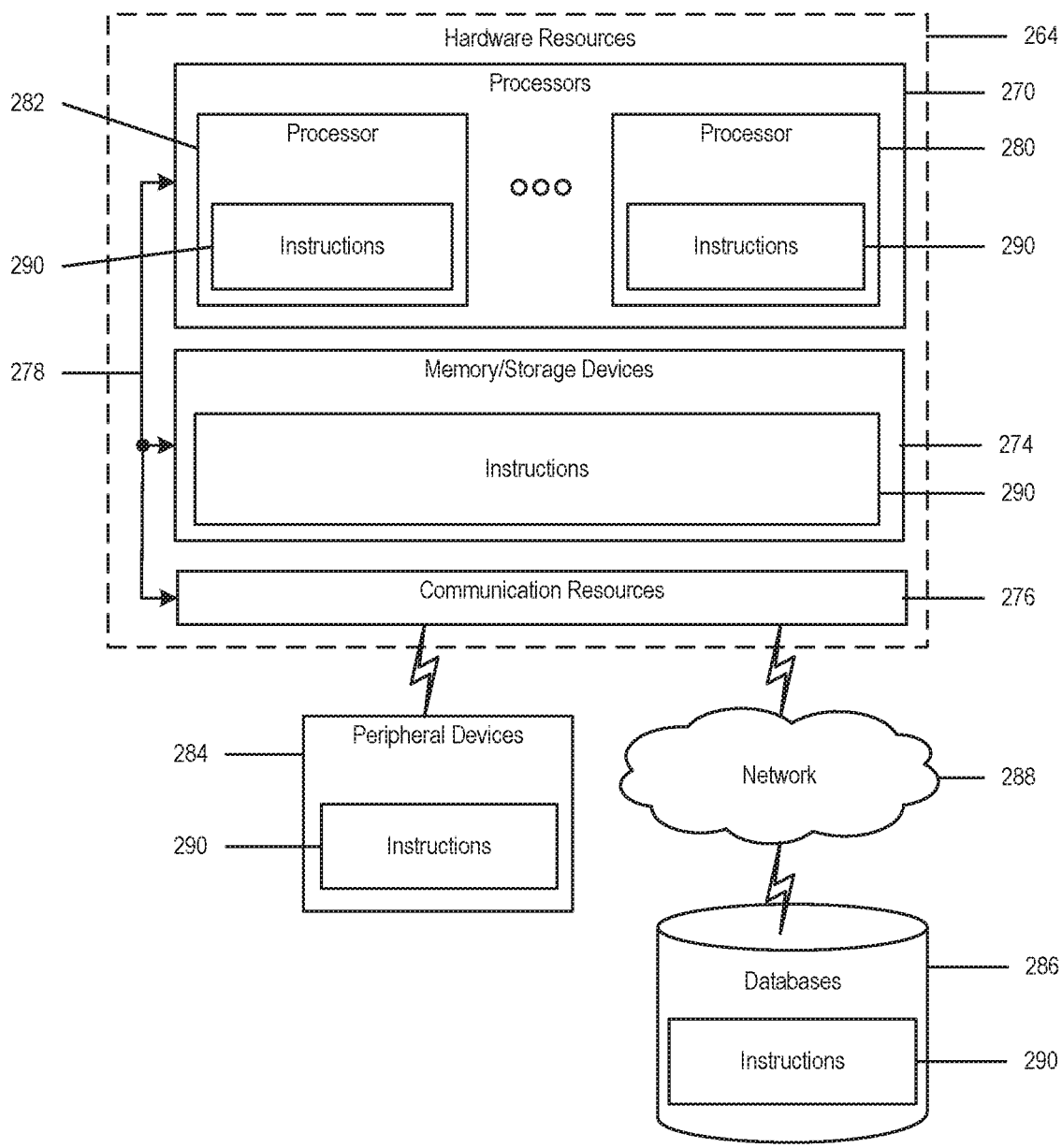
FIG. 14 is a block diagram showing components, according to some example embodiments, able to read instructions from a non-transient machine-readable or computer-readable medium (e.g., a machine-readable storage medium) and perform any one or more of the methods discussed herein.

FIG. 14 is a block diagram illustrating components, according to some example embodiments, able to read instructions from a machine-readable or computer-readable medium (e.g., a machine-readable storage medium) and perform any one or more of the methods discussed herein. For example, components of FIG. 14 may be included in each dimensioner head 44, 48; associated processing circuitry 52; computer 30; or a remotely located computer (e.g., cloud computing resources).

Specifically, FIG. 14 shows a diagrammatic representation of hardware resources 264 including one or more processors (or processor cores) 270, one or more memory/ storage devices 274, and one or more communication resources 276, each of which are communicatively coupled via a bus 278.

Processors 270 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), another processor, or any suitable combination thereof) may include, for example, a processor 280 and a processor 282. Memory/storage devices 274 may include main memory, disk storage, or any suitable combination thereof.

Communication resources 276 may include interconnection and/or network interface components or other suitable devices to communicate with one or more peripheral devices 284 and/or one or more databases 286 via a network 288. For example, communication resources 276 may include wired communication components (e.g., for coupling via a Universal Serial Bus (USB)), cellular communication components, Near Field Communication (NFC) components, Bluetooth® components (e.g., BLE), Wi-Fi® components, and other communication components.

Instructions 290 may comprise software, a program, an application, an applet, an app, or other executable code for causing at least any of processors 270 to perform any one or more of the methodologies discussed herein. Instructions 290 may reside, completely or partially, within at least one of processors 270 (e.g., within cache memory of processor 280), memory/storage devices 274, or any suitable combination thereof. Furthermore, any portion of instructions 290 may be transferred to hardware resources 264 from any combination of peripheral devices 284 or databases 286. Accordingly, memory of processors 270, memory/storage devices 274, peripheral devices 284, and databases 286 are examples of computer-readable and machine-readable media.

A software module or component may include any type of computer instruction or computer-executable code located within a memory device. A software module may, for instance, include one or more physical or logical blocks of computer instructions, which may be organized as a routine, program, object, component, data structure, etc., that perform one or more tasks or implement particular data types. It is appreciated that a software module may be implemented in hardware and/or firmware instead of or in addition to software. One or more of the functional modules described herein may be separated into sub-modules and/or combined into a single or smaller number of modules.

In certain embodiments, a particular software module may include disparate instructions stored in different locations of a memory device, different memory devices, or different computers, which together implement the described functionality of the module. Indeed, a module may include a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

Although the foregoing has been described in some detail for purposes of clarity, it will be apparent that certain changes and modifications may be made without departing from the principles thereof. It should be noted that there are many alternative ways of implementing both the processes and apparatuses described herein. Skilled persons will appreciate that many changes may be made to the details of the above-described embodiments without departing from the underlying principles of the disclosure. For example, the described techniques are applicable to any convex objects having a flat top and vertical walls, such as, for example, vertically standing cylinders or hex prisms. Moreover, skilled persons will appreciate that for cuboidal boxes, which are the most common scanned objects, upper CHs are synonymous to bounding boxes that also provide a reference to which lower CHs are projected upwardly. The scope of the present invention should, therefore, be determined only by the following claims.

The invention claimed is:

1. A method of detecting presence of shadowing introduced in a system including one or more laser scanning devices employing laser beam scanning for facilitating extraction of convex hull (CH) planar objects from a three-dimensional (3D) point cloud representing two or more flat-top volumetric objects of different heights on a transport device, the shadowing being attributable to a taller one of the two or more flat-top volumetric objects occluding the laser beam scanning from reaching at least a portion of a shorter one of the two or more flat-top volumetric objects, and the CH planar objects representing unoccluded upper surface regions of the two or more flat-top volumetric objects with lower and higher CH planar objects corresponding to, respectively, the shorter and taller flat-top volumetric objects, the method comprising:

geometrically projecting, along a propagation direction of the laser beam scanning, points of the lower CH planar object in a direction toward the higher CH planar object to establish projection locations of the points of the lower CH planar object along the propagation direction;

detecting whether the projection locations are in proximity to locations of points of the higher CH planar object; and in response to detecting locations in proximity for each of the one or more laser scanning devices, generating a shadowing event indication to alert a user of the system that shadowing has been introduced in the system.

2. The method of claim 1, in which the flat-top volumetric objects comprise flat-top cylinders.

3. The method of claim 1, in which the one or more laser scanning devices comprise dimensioners.

4. The method of claim 1, in which the propagation direction comprises a virtual propagation direction between a point of the 3D point cloud and one of the one or more laser scanning devices that did not capture the point.

5. The method of claim 1, in which the projection locations define lines in a plane, and the lines connect the lower CH planar object with its corresponding projected CH planar object counterpart.

6. The method of claim 5, in which the detecting comprises determining whether the lines intersect the higher CH planar object.

7. The method of claim 5, in which the detecting comprises determining whether the lines are adjacent to a corner of the higher CH planar object.

8. The method of claim 1, in which the transport device comprises a conveyor on which the two or more flat-top volumetric objects are moved through a scan volume of the one or more laser scanning devices, the method further comprising halting movement of the conveyor in response to the generation of the shadowing event indication.

9. The method of claim 1, in which the system further includes a display interface for the user, the method further comprising presenting on the display interface a message conveying details of the shadowing event indication to the user.

10. The method of claim 1, further comprising:
determining a continuous distance between locations determined to be in proximity to one another; and
comparing the continuous distance to a threshold distance so as to confirm or reject an indication of the presence of shadowing.

11. The method of claim 1, in which the two or more flat-top volumetric objects include a third flat-top volumetric object that is taller than the taller one of the two or more flat-top volumetric objects, and the CH planar objects include a third CH planar object corresponding to the third flat-top volumetric object, the method further comprising repeating the geometrically projecting and the detecting for the third CH planar object.

12. A machine-readable storage medium storing instructions thereon that, when executed by a processor, configure the processor to perform the method recited in claim 1.

13. A system to detect presence of shadowing based convex hull (CH) planar objects extracted from a three-dimensional (3D) point cloud representing two or more flat-top volumetric objects of different heights on a transport device, the shadowing being attributable to a taller one of the two or more flat-top volumetric objects occluding laser beam scanning from reaching at least a portion of a shorter one of the two or more flat-top volumetric objects, and the CH planar objects representing unoccluded upper surface regions of the two or more flat-top volumetric objects with lower and higher CH planar objects corresponding to, respectively, the shorter and taller flat-top volumetric objects, the system comprising:
machine-readable storage for storing information representing the CH planar objects; and
a processing device configured to process the information to:
geometrically project, along a propagation direction of the laser beam scanning, points of the lower CH planar object in a direction toward the higher CH planar object to establish projection locations of the points of the lower CH planar object along the propagation direction;
detect whether the projection locations are in proximity to locations of points of the higher CH planar object; and
in response to detection of locations in proximity for each source of the laser beam scanning, generate a shadowing event indication to alert a user of the system that shadowing has been introduced in the system.

14. The system of claim 13, further comprising one or more laser scanning devices acting as sources of the laser beam scanning.

15. The system of claim 14, in which the transport device comprises a conveyor on which the two or more flat-top volumetric objects are moved through a scan volume of the one or more laser scanning devices.

16. The system of claim 13, in which each source of the laser beam scanning comprises a dimensioner.

17. The system of claim 13, further comprising a display interface for presenting details of the shadowing event indication to the user.

18. The system of claim 13, in which the processing device is remotely located from each source of the laser beam scanning.

19. The system of claim 13, further comprising a frame on which are mounted the processing device and each source of the laser beam scanning.

20. The system of claim 13, in which each source of the laser beam scanning comprises a dimensioner located above the transport device and at a longitudinal position along a direction of transport that is different from another dimensioner.

* * * * *